*(12)* United States Patent
Spikes et al.

(10) Patent No.: US 10,313,391 B1
(45) Date of Patent: Jun. 4, 2019

(54) DIGITAL DISTILLATION

(71) Applicant: Spikes, Inc., Los Gatos, CA (US)

(72) Inventors: Branden Spikes, Los Gatos, CA (US); Scott Alexander, Los Gatos, CA (US)

(73) Assignee: Cyberinc Corporation, San Ramon, CA (US)

( * ) Notice: Subject to any disclaimer, the term of this patent is extended or adjusted under 35 U.S.C. 154(b) by 88 days.

(21) Appl. No.: 15/339,726

(22) Filed: Oct. 31, 2016

Related U.S. Application Data

(60) Provisional application No. 62/249,067, filed on Oct. 30, 2015.

(51) Int. Cl.
 *H04L 12/58* (2006.01)
 *H04L 29/06* (2006.01)

(52) U.S. Cl.
 CPC .......... *H04L 63/1441* (2013.01); *H04L 51/12* (2013.01); *H04L 63/1425* (2013.01)

(58) Field of Classification Search
 CPC .. H04L 63/1441; H04L 51/12; H04L 63/1425
 See application file for complete search history.

(56) References Cited

U.S. PATENT DOCUMENTS

| | | | | |
|---|---|---|---|---|
| 6,857,102 B1* | 2/2005 | Bickmore | ........... | G06F 17/2247 707/E17.121 |
| 7,752,534 B2* | 7/2010 | Blanchard, III | ........ | G06F 17/22 715/201 |
| 8,527,860 B1* | 9/2013 | Colton | .............. | G06F 17/30893 709/203 |
| 8,683,596 B2* | 3/2014 | Amit | ....................... | G06F 21/52 709/225 |
| 8,719,451 B1* | 5/2014 | Colton | ................ | G06F 17/3089 709/248 |
| 8,752,183 B1* | 6/2014 | Heiderich | ............. | G06F 21/577 726/22 |
| 8,819,539 B1* | 8/2014 | Colton | .............. | G06F 17/30902 707/755 |
| 8,914,774 B1* | 12/2014 | Colton | ................ | G06F 9/44578 709/203 |
| 8,949,990 B1* | 2/2015 | Hsieh | .................... | G06F 21/577 726/22 |
| 9,208,235 B1* | 12/2015 | Liu | .................... | G06F 17/30864 |
| 9,241,004 B1* | 1/2016 | April | ..................... | G06F 21/606 |
| 9,325,734 B1* | 4/2016 | Peacock | ............. | G06F 17/2247 |
| 9,414,095 B1* | 8/2016 | Corda | ................. | H04L 63/0428 |

(Continued)

*Primary Examiner* — Beemnet W Dada
*Assistant Examiner* — Stephen T Gundry
(74) *Attorney, Agent, or Firm* — Wilson Sonsini Goodrich & Rosati

(57) ABSTRACT

A method of automatically reformatting electronic content for providing to a visual display of an electronic device of a user is provided. The method comprises receiving a first version of electronic content. The method also comprises identifying one or more elements within the electronic content, each element having a first format. Additionally, the method comprises identifying a corresponding second format for each of the one or more elements. The method also comprises automatically reformatting the first version of the electronic content to a second version of the electronic content. The method further comprises presenting the second version of the electronic content on said visual display of an electronic device of the user.

6 Claims, 5 Drawing Sheets

(56) References Cited

U.S. PATENT DOCUMENTS

| | | | |
|---|---|---|---|
| 9,477,836 B1* | 10/2016 | Ramam | G06F 21/6263 |
| 9,489,356 B2* | 11/2016 | Sheretov | G06F 17/30873 |
| 9,489,526 B1* | 11/2016 | Call | G06F 21/62 |
| 9,584,543 B2 | 2/2017 | Kaminsky | H04L 63/168 |
| 9,614,862 B2 | 4/2017 | Stern | H04L 63/1425 |
| 9,639,519 B1* | 5/2017 | Sebastian | G06F 17/30887 |
| 9,639,619 B2* | 5/2017 | Yao | G06F 17/30873 |
| 9,641,591 B1* | 5/2017 | Kolam | H04L 67/2823 |
| 9,924,235 B2* | 3/2018 | Ansari | H04N 21/482 |
| 2002/0198743 A1* | 12/2002 | Ariathurai | G06Q 30/02 705/4 |
| 2007/0016949 A1* | 1/2007 | Dunagan | G06F 21/51 726/22 |
| 2008/0046562 A1* | 2/2008 | Butler | G06F 17/3089 709/224 |
| 2009/0063500 A1* | 3/2009 | Zhai | G06F 17/30896 |
| 2010/0333174 A1* | 12/2010 | Broerman | H04L 63/126 726/3 |
| 2014/0258384 A1* | 9/2014 | Spikes | G06F 9/543 709/203 |
| 2014/0259171 A1* | 9/2014 | Spikes | H04L 63/1441 726/23 |
| 2017/0078732 A1* | 3/2017 | Ansari | H04N 21/482 |
| 2018/0020010 A1* | 1/2018 | Bhardwaj | H04L 63/08 |
| 2018/0048918 A1* | 2/2018 | Salinger | H04N 7/17318 |

* cited by examiner

DIGITAL DISTILLATION

CROSS-REFERENCE TO RELATED APPLICATIONS

This application claims the benefit of U.S. Provisional Patent Application Ser. No. 62/249,067 entitled "Digital Distillation," filed Oct. 30, 2015, which is hereby incorporated by reference in its entirety.

BACKGROUND OF THE INVENTION

The exchange of information between individuals is largely based on electronic communications. However, the prevalence of malware within electronic communications has made it increasingly difficult to provide a secure environment for individuals to provide, share, and receive electronic content.

SUMMARY OF THE INVENTION

Methods and systems for distilling electronic content are provided. In particular, methods and systems are provided for removing malware and other undesirable aspects of electronic content. In some cases, the removal of malware from electronic content may be performed automatically upon receipt of the electronic content. This removal of malware and other undesirable aspects of electronic content may be accomplished by transforming a first version of electronic content having a first format into a second version of the electronic content having a second format that is different than the first format. During the transformation of the first version of electronic content to the second version of the electronic content, malware that is present in the first version of the document may be removed (e.g., may be left out of the second version of the electronic content as being unable to be transformed). Alternatively, malware that is present in the first version of the electronic content may be rendered unexecutable based on the transformation process.

Accordingly, methods and systems discussed herein provide processes of distilling electronic content so as to remove potential malware within the electronic content. Additionally, embodiments described herein provide for the dividing of electronic content into functional components. In particular, electronic content that is associated with a video file may be separated into component parts associated with audio and visual elements of the video file. These separate elements may, in turn, be transformed so as to remove potential malware (a process which may be referred to as "digitally distilled") and then realigned into a final product that may be presented to a user as a video.

In additional embodiments, electronic content may be automatically transformed to remove potential malware. In particular, a user may request electronic content from a source. Prior to providing the electronic content to the user, however, a digital distillation system may process the electronic content so as to remove any potential malware within the electronic content. This transformation may occur without looking into the electronic content. In examples, the transformation may be oblivious to what is contained within the electronic content. This transformation of the electronic content may also occur without input from the user. Additionally, the automatic digital distillation of the electronic content may occur in real time.

Further embodiments described herein provide for maintaining a copy of original web content in an isolated container while providing a distilled version of the web content to an end user. In examples, the original content that is maintained in an isolated container may be edited and/or modified. The modified original web content may then be distilled again, and a distilled version of the modified original content may be provided to a user.

An aspect of the invention provides a method for automatically reformatting electronic content for providing to a visual display of an electronic device of a user. The method comprises receiving a first version of electronic content. The first version of the electronic content is retrieved based on a request generated by a user from a user interface of an electronic device of said user. Additionally, the method comprises identifying one or more elements within the electronic content. Each of the one or more elements is associated with a format. The method also comprises identifying a corresponding second format for each of the one or more elements that are within the first version of the electronic content. The corresponding second format of each of the one or more elements is distinct from the first format of each of the one or more elements. Further, the method comprises automatically reformatting the first version of the electronic content to a second version of the electronic content. The second version of the electronic content includes one or more elements each having a second format that corresponds to and differs from the first format of each of the one or more elements. Additionally, the method comprises presenting the second version of the electronic content on said visual display of the electronic device of the user.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
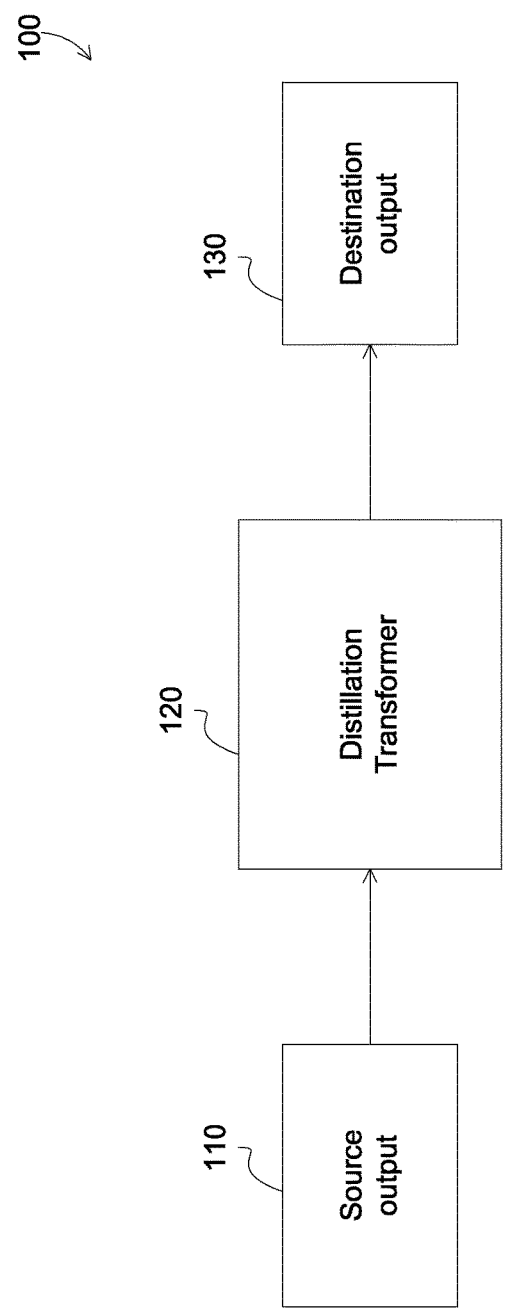
FIG. 1 illustrates a digital distillation process that transforms source output into destination output, in accordance with embodiments of the invention.

Current systems for removing malware generally rely on methods of identifying portions of electronic content that has been infected by malware and then filtering those portions out prior to providing the electronic content to a user. However, as malware has become increasingly prevalent and sophisticated in electronic communications, it has become increasingly difficult for malware security services to accurately identify portions of electronic content that have become compromised by malware. In order to correct this lacking, methods of distilling electronic content may be used to remove and/or to render safe potentially malicious content without going through an extra step of identifying malicious content.

Methods and systems for distilling electronic content are provided. In particular, methods and systems are provided for processing electronic content so as to remove malware and other undesirable aspects that may be present within the electronic content. As provided herein, electronic content that has a first digital encoding may be transformed to a second, different digital encoding in order to distill out and/or inoculate malicious content that may be within the electronic content. In examples, the transformation process itself may remove malware by, for example, only transforming content that is ASCII and leaving behind content that is binary code. In this way, the transformed electronic content may be distilled to a format that no longer has malicious content.

The electronic content having the distilled digital encoding may then be presented in the new encoding to an end user. The new encoding may retain visually perceptible elements of the original electronic content so that a user may be unaware that the digitally distilled content is distinct from the original content. Additionally, the content and quality of the original electronic content may be retained so that a user may not be able to tell the difference between the digitally distilled electronic content and the original electronic content. Alternatively, the distilled electronic content may be re-encoded back into its original format and presented to the end user.

When transforming the electronic content from a first version to a second, different version, a distillation process may transform the first version to a format that has beneficial security characteristics. In particular, the distillation process may transform the first version to a second version having a format that has fewer scripts and/or low latency. In further examples, the distillation process may transform the first version to a format having encoding mechanisms within the format itself, where the encoding mechanisms may be more impervious to malware than a method of manually converting documents from one format to another. In this way, the second version of the electronic content may not only have a potential malware removed, but may also be in a resultant format that is more secure and resistant to future malware.

Additionally, the digital distillation process may be automatically performed on electronic content that is provided to a user. In examples, any electronic content directed to the user may be digitally distilled. In further examples, the digital distillation process may be automatically performed on electronic content that is provided to an end user from one or more given sources. For example, electronic content that is received by an end user from a particular website may be automatically distilled. In additional examples, electronic content from a different source may be trusted. In examples, the digital distillation of electronic content may be performed automatically. In particular, the digital distillation of electronic content may be performed without user input. In other examples, the digital distillation of electronic content may be performed in a way that retains visually perceptible elements of the original document such that a user might be unaware that the digitally distilled document has been modified from the original document.

In a digital distillation process, a first version of electronic content may be reformatted into another, different version of the electronic content. In particular, the first version of electronic content may be transformed from a first format to another, different format of the electronic content. An example of a digital distillation process is illustrated in FIG. 1. In particular, FIG. 1 illustrates a digital distillation process 100 that transforms source output into destination output, in accordance with embodiments of the invention. As seen in FIG. 1, source output 110 is transformed at a distillation transformer 120. Once the source output 110 has been transformed to generate destination output 130, the destination output 130 may be provided to an end user at an endpoint. In some examples, the endpoint may be a computing device of an end user. In other examples, the endpoint may be a web server that provides content to a website.

In accordance with FIG. 1, an example of source output may be a Microsoft Office Word Document that is transformed into a Jpeg image file or PDF file as a destination output. This transformation process may be used to automatically strip out any malware imbedded in the office document. The transformed PDF document may be presented to an end user. Alternatively, the transformed PDF may be re-converted to a Microsoft Office Word Document for presentation to the end user. In this example, however, the transformed Microsoft Office Word Document may have the advantage over the original Microsoft Office Word Document of having malware embedded in the original document removed.

Figure 2:
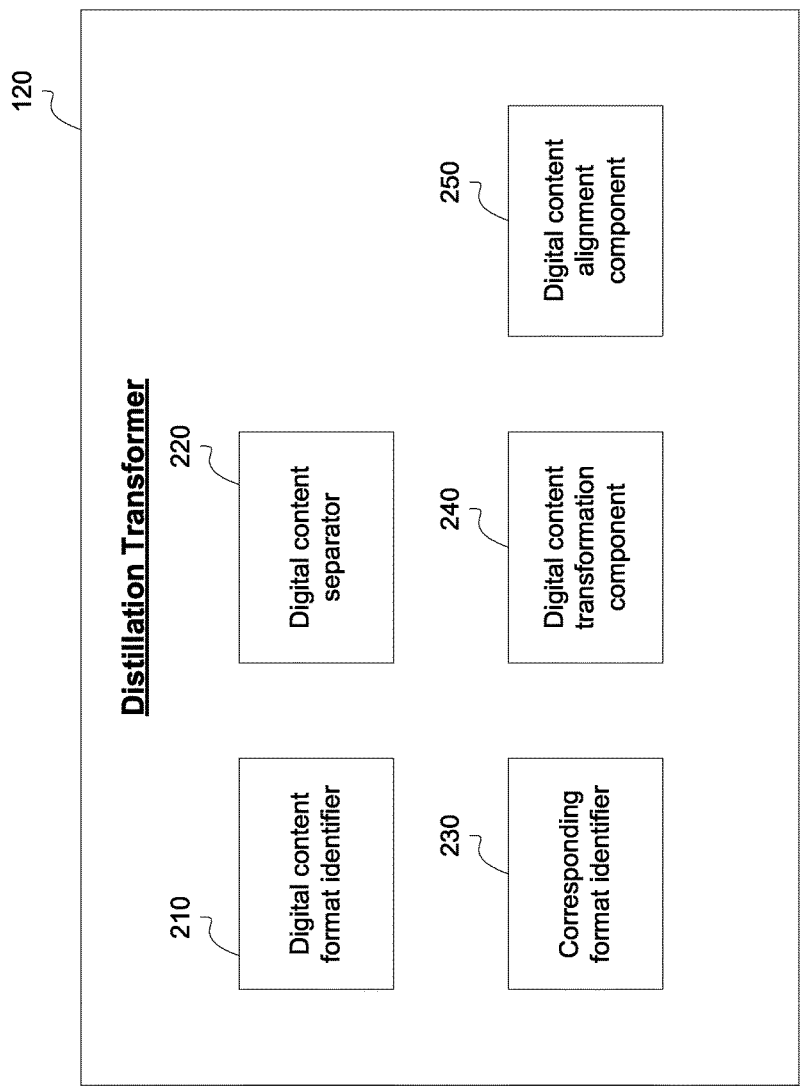
FIG. 2 illustrates components of a distillation transformer, in accordance with embodiments of the invention.

The transformation of source output 110 into destination output 130 occurs at distillation transformer 120. In order to illustrate processes that may occur within distillation transformer 120, FIG. 2 illustrates components of a distillation transformer 120, in accordance with embodiments of the invention. As seen in FIG. 2, distillation transformer 120 comprises a electronic content identification component 210; electronic content separation component 220; reformatting content identification component 230; electronic content transformation component 240; and electronic content rejoining component 250.

When source output 110 is initially received at a distillation transformer, the source output 110 includes electronic content that may be identified. In examples, if source output includes electronic content such as documents, the electronic content identification component 210 may identify Microsoft Office Document Files within the electronic content. In additional examples, if the source output includes electronic content such as video, the electronic content identification component may identify .mov media files within the electronic content. In further examples, the electronic content identification component may identify Adobe Flash characteristics of electronic content.

Once the format or formats of the electronic content is identified, the electronic content may be separated into different parts at electronic content separation component 220. For example, electronic content that is associated with a video may be separated into component parts associated with audio and visual elements of the video. These separate elements may, in turn, be digitally distilled and then realigned into a final product having the look of a video but without the risk of malicious content.

When reformatting electronic content, a first file having a first format may be transformed to a second file having a second format that differs from the first format. For example, in document files, a Microsoft Word Document File may be transformed to a PDF file, as described above. As such, when reformatting files, a corresponding format may be identified so as to transform electronic content having a first format to a second, different file format. This is illustrated in FIG. 2 as corresponding format identifier 230. In particular, different formats may be associated with different file types. For example, if a user request to print a document, the destination output may be a PDF file. Alternatively, if a user wishes to display web content, the destination output may be a combination of .png files, video stream, and audio stream. In further examples, if a user wishes to download clipboard data, the original format of the clipboard data may be identified, and then the clipboard data may be reformatted based on the determined original font of the clipboard data. In this way, the corresponding format identifier may be used to identify formats that may be used to strip out potentially malicious content from a file based on the original format of the file.

Once the appropriate format of the second file is identified by corresponding format identifier 230, the first file may be transformed into the second file. In particular, the first file having a first format may be reformatted to the second file having a second format that differs from the format of the first file. This transformation is represented as occurring at electronic content transformation component 240.

Additionally, if a file has been separated into different parts, such as if a video file has been separated into audio and video components, the resulting distilled video components may be aligned at electronic content alignment component 250. In another example, HTML5 and Javascript code and media assets may be transformed into a remote display protocol that combines a video stream, an audio stream, and a still picture stream, each of which digitally distills potential hidden malware in the HTML, Javascript, and media files, respectively. As such, the rendered web content may be presented onto a remote device in the new format.

Figure 3:
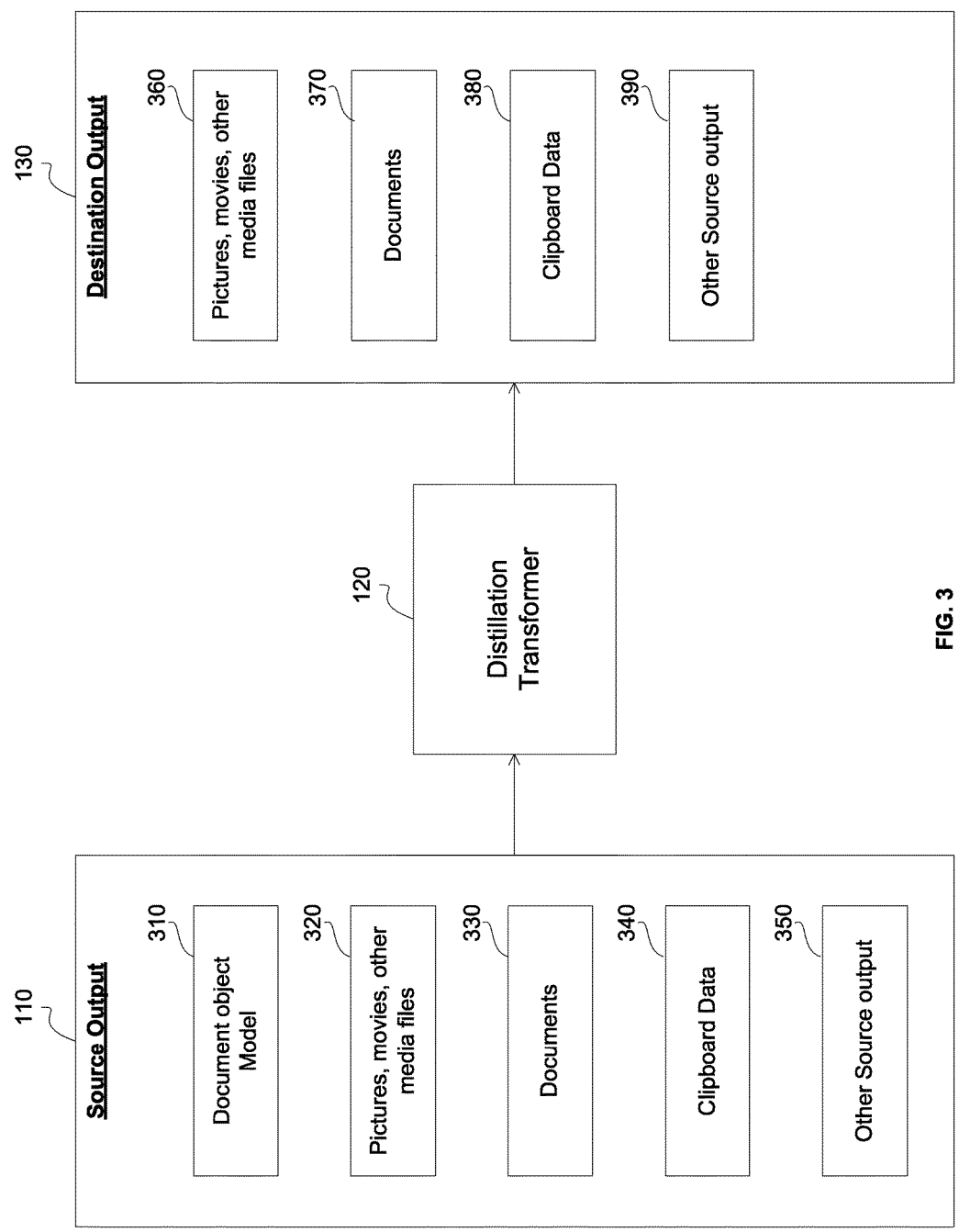
FIG. 3 illustrates different examples of electronic content that may be transformed through digital distillation, in accordance with examples of the invention.

FIG. 3 illustrates different examples of electronic content that may be transformed through digital distillation, in accordance with examples of the invention. In examples, when a user is accessing electronic content on the Internet, reformatting of electronic content may be performed without the user's knowledge or selection. In examples, the transformation of electronic content may occur at a point before the web content is received at a user's web browser so as to protect the user as well as the user's web browser from infection by malware. Accordingly, in examples, a distillation system may take electronic content output from a web browser and distill the electronic content by converting it to another format. The reformatting process may be used to removing any possible malware that may be in it. In examples, the reformatting process may inherently remove the malware within electronic content without having to see it or identify it or even to understand that it exists.

Accordingly, FIG. 3 illustrates source output 110 that includes document object models 310; media files 320; documents 330; clipboard data 340; and other source output 350. As provided in FIG. 3, a document object model 310 may be created by a web browser from HTML and JavaScript code. Instead of passing the document object model 310 to a destination for display, however, a digital distillation process may store the document object model 310 within an isolated container. Instead, the document object model 310 may be digitally distilled prior to display at a destination, such as an end point.

Examples of transformations of source outputs are provided in FIG. 3. In particular, the source output is transformed into a format that is determined based on the original format of the source output. Any hidden malware or potentially malicious content that is within the electronic content prior to this transformation process may either be removed from the electronic content or may be transformed in such a way that is no longer executable as malware. For example, remnants of malware may be unexecutable after the electronic content having the malware is transformed. As provided in FIG. 3, source output media files 320 may be transformed to destination output media files 360. Similarly, source output documents 330 may be transformed to destination output documents 370, and source output clipboard data 340 may be transformed to destination output clipboard data 380, accordingly. Additionally, other source output 350 may also be transformed to other source output 390.

In additional examples, multiple elements of electronic content within source output may be transformed simultaneously. In other examples, multiple elements of electronic content within source output may be transformed in a short amount of time. In an example, a social media homepage may contain dozens of elements. Each element may be one of a text file, image file, video file, or other file type. In previous systems, a user may have attempted to avoid malware by manually reformatting each element on the webpage. However, the manual reformatting of individual elements within a webpage may take a user a large number of minutes (e.g., ten minutes, twenty minutes, etc.). Additionally, if a user individually reformats an element of electronic content, the user may make an error and choose a second format that either fails to remove malware or fails to choose a format that retains a high degree of quality.

Accordingly, using a digital distillation process, a social media webpage having dozens of elements may be automatically assessed to automatically identify every element on the webpage, automatically determine the format of each element on the webpage, automatically determine a new, different format for each element based on the element's original format, and then automatically reformat each of the elements within a threshold amount of time (e.g., 0.25 seconds or less). In this example, elements that are text files may be converted to .png files. In particular, the reformatting of the text file to a .png file may filter out any binary data and allow only ASCII data. Additionally, elements that are video files may be converted to a video stream aligned with an audio stream.

In addition to digitally distilling electronic content as described above, additional aspects of the invention may include providing digitally distilled electronic content automatically to a user. For example, as a user scrolls through a web page, downloading additional content as it comes into view, the new content may be automatically digitally distilled in real-time. In particular, multiple sources of web content may be simultaneously using methods provided herein. By distilling multiple web content components at the same time, the distillation of a web page may occur much more quickly than when web content components of a web page are reformatted on a one-by-one bases. In examples, the format of the new content may be identified as it is received from a web page, and the content may be reformatted to a different format based on the initial format of the content. When content is distilled in real-time, the process of distilling the content may be less than 0.25 seconds, 0.3 seconds, 0.4 seconds, 0.5 seconds, 0.6 seconds, 0.7 seconds, 0.8 seconds, 0.9 seconds, or 1 second per frame. In contrast, if a user were to manually reformat content such as a word document, it may take a minute or more, or 240× as much time, to perform the reformatting process.

Additionally, when reformatting electronic content, one or more visually perceptible elements of the original document may be kept in during the re-formatting process so as to present the user with a re-formatted document having visually perceptible characteristics of the original document. In some examples, the quality and content of the original electronic content may be preserved. As such, when presenting the re-formatted document to the user, the user may be unaware that the re-formatting has occurred.

Accordingly, methods and systems discussed herein provide a process of providing electronic content that automatically distills the electronic content so as to remove malware without taking the extra step of determining whether the electronic content is itself compromised. By avoiding the costly and intensive step of trying to identify whether content has been compromised, the distilling process discussed herein allows a user to access distilled content across platforms without having to run the electronic content through anti-virus software.

Figure 4:
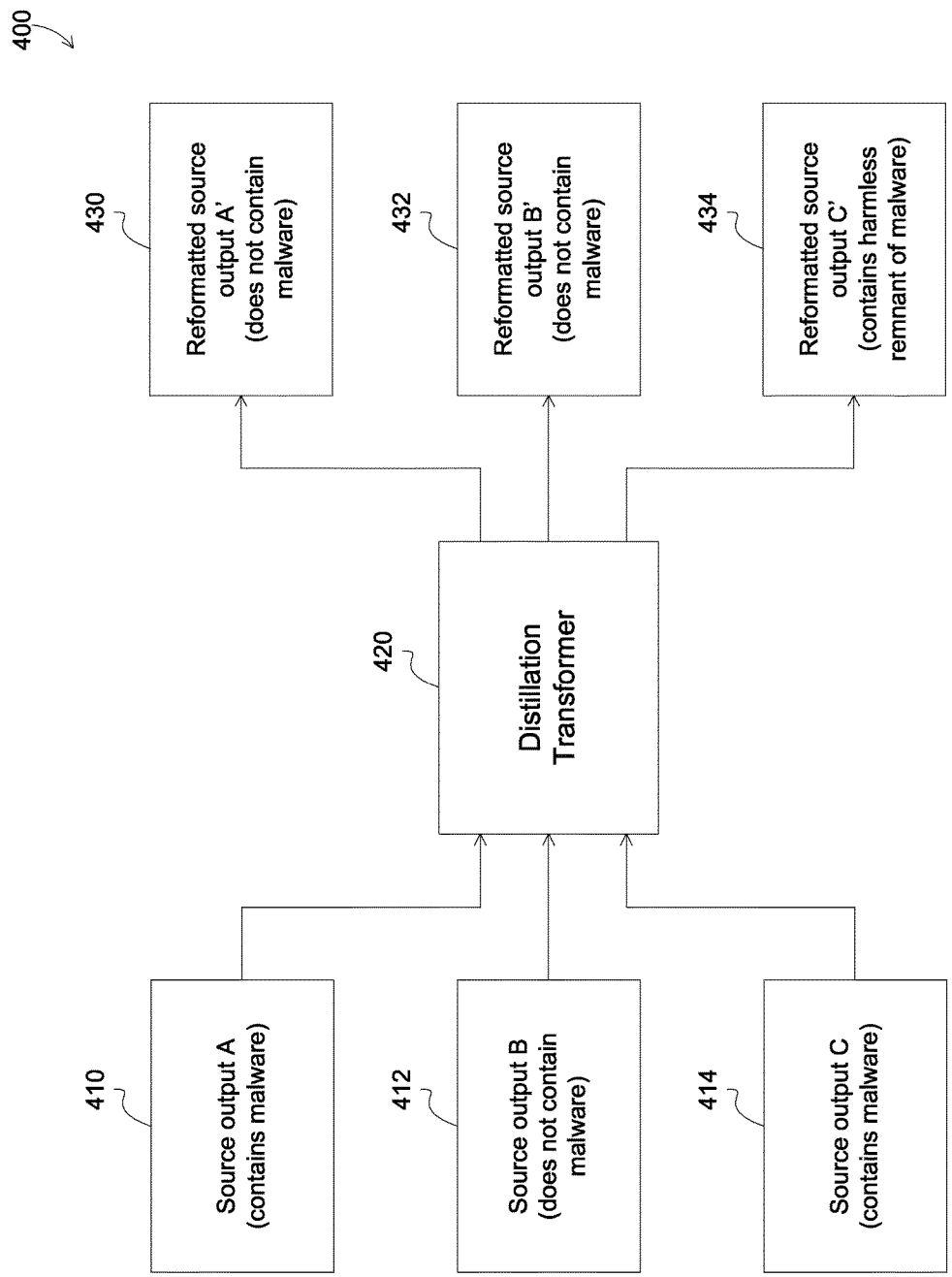
FIG. 4 illustrates a schematic of a digital distillation process performed on three types of source output, in accordance with embodiments of the invention.

FIG. 4 illustrates a schematic of a digital distillation process 400 performed on three types of source output, in accordance with embodiments of the invention. In particular, FIG. 4 provides Source output A at component 410, Source output B at component 412, and Source output C at component 414. Source output A and Source output C contain malware, whereas Source output B does not contain malware. However, the digital distillation process may be ignorant as to whether the Source output contains malware and/or potentially malicious content. In particular, a benefit of using the digital distillation process is to provide a process that removes malware or potentially malicious content from source output without needing to identify malware or potentially malicious content within the source output.

In examples, a digital distillation process may be performed on source output that is received. In examples, source output may be received from a web browser, from e-mail, from a file download, or from another source. In some examples, all source output that is received from one or more sources may be transformed using a digital distillation process. In additional examples, a portion of source output may be transformed using a digital distillation process. During a digital distillation process, source output may be transformed so as to remove potentially malicious software. In particular, source output may be transformed from a first format to a second, different format, thereby removing or disabling potentially malicious content. The resultant effect of the transformation process on electronic content within the source output may be assessed based on the starting composition of the electronic content itself.

For example, as seen in FIG. 4, Source outputs 410, 412, and 414 are transformed using a distillation transformer 420. In some examples, a source output is transformed so as to remove malware within the electronic content of the source output. This is seen in FIG. 4 as Source output A in component 410 is transformed to remove malware thereby producing Reformatted source output A' as provided in component 430. In other examples, when source output does not contain malware, the resultant product is a reformatted version of the source output. This is seen in FIG. 4 as Source output B in component 412 is transformed to Reformatted source output B' as provided in component 432. Additionally, in examples, source output may be transformed so as to render malware unexecutable. This is seen in FIG. 4 as Source output C in component 414 is transformed to Reformatted source output C' as provided in component 434. In particular, Source output C' may still contain remnants of malware, but the remnants may be inoculated by the digital transformation process itself. Accordingly, source output that is received at a digital distillation processing system may be transformed independent of whether the initial source output included malware. In particular, a process of distilling source output may ensure that destination output resulting from the digital distillation process is without executable malware or malicious content, and may ensure this independent of the content within the source output.

Computer Control Systems

Figure 5:
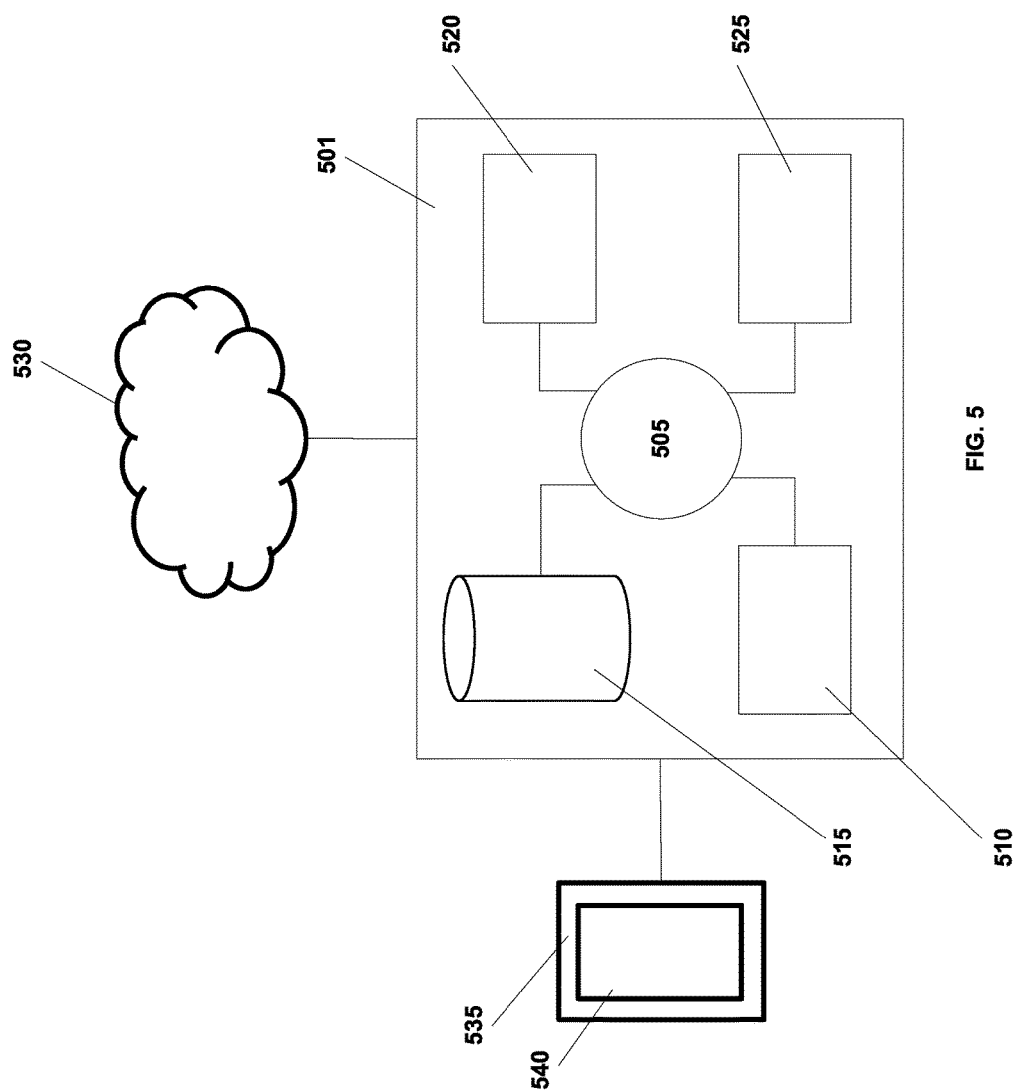
FIG. 5 illustrates a computer control system that is programmed or otherwise configured to implement methods provided herein.

The present disclosure provides computer control systems that are programmed to implement methods of the disclosure. FIG. 5 shows a computer system 501 that is programmed or otherwise configured to remove malware from electronic content. In particular, computer system 501 may be programmed or otherwise configured to automatically remove malware from electronic content. The computer system 501 can regulate various aspects of digitally distilling electronic content of the present disclosure, such as, for example, identifying received source output, identifying formats of electronic content within source output, determining corresponding formats based on the original formats of the electronic content, transforming electronic content through a digital distillation process, and providing digitally distilled electronic content to an electronic device of a user. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, display of web browsers, documents, and media files that have been digitally distilled. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, identify a first format of electronic content; determine a second, different format for electronic content based on the first format; and transform the electronic content into the second format.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for automatically reformatting electronic content for secure viewing on a visual display of an electronic device of a user, comprising:

receiving a first version of electronic content, wherein the first version of the electronic content is retrieved based on a request generated by a user from a user interface of an electronic device of said user;

identifying one or more elements within the electronic content, wherein each of the one or more elements is associated with a first format;

identifying a corresponding second format for each of the one or more elements that are within the first version of the electronic content, wherein the corresponding second format of each of the one or more elements is distinct from the first format of each of the one or more elements;

automatically reformatting the first version of the electronic content to a second version of the electronic content, wherein the second version of the electronic content includes one or more elements each having the second format that corresponds to and differs from the first format of each of the one or more elements, thereby removing potential malware present in the first version of the electronic content that cannot be reformatted;

automatically reformatting the second version of the electronic content to a third version of the electronic content, the third version of the electronic content having the first format; and presenting the third version of the electronic content within a more secure environment on said visual display of the electronic device of the user.

2. The method of claim 1, further comprising:

maintaining a copy of the first version of the electronic content.

3. The method of claim 2, wherein the first version of the electronic content is physically isolated from the electronic device of the user.

4. The method of claim 1, wherein the first version of electronic content is a video file.

5. The method of claim 4, wherein the first version of electronic content comprises an audio element having a first audio format and an image element having a first image format, wherein the audio element is automatically reformatted from the first audio format to a second audio format, and wherein the image element is automatically reformatted from the first image format to a second image format.

6. The method of claim 5, wherein the automatic reformatting comprises aligning the second version of the audio element with the second version of the image element.

* * * * *